United States Patent
Chabert et al.

(10) Patent No.: US 11,092,556 B2
(45) Date of Patent: Aug. 17, 2021

(54) INSTALLATION FOR OPTICAL INSPECTION OF GLASS CONTAINERS AT THE OUTLET OF A FORMING MACHINE

(71) Applicant: TIAMA, Vourles (FR)

(72) Inventors: Adrien Chabert, Lyons (FR); Philippe Michel, Champigny sur Marne (FR); Christophe Ortiz, Lyons (FR)

(73) Assignee: TIAMA, Vourles (FR)

( * ) Notice: Subject to any disclaimer, the term of this patent is extended or adjusted under 35 U.S.C. 154(b) by 107 days.

(21) Appl. No.: 16/333,310

(22) PCT Filed: Sep. 19, 2017

(86) PCT No.: PCT/FR2017/052496
§ 371 (c)(1),
(2) Date: Mar. 14, 2019

(87) PCT Pub. No.: WO2018/051046
PCT Pub. Date: Mar. 22, 2018

(65) Prior Publication Data
US 2019/0242831 A1     Aug. 8, 2019

(30) Foreign Application Priority Data

Sep. 19, 2016   (FR) ..................................... 16 58752

(51) Int. Cl.
*G01N 21/90*     (2006.01)
(52) U.S. Cl.
CPC ..... *G01N 21/9036* (2013.01); *G01N 21/9009* (2013.01); *G01N 2021/9063* (2013.01); *G01N 2201/0438* (2013.01)

(58) Field of Classification Search
CPC .......... G01N 21/9036; G01N 21/9009; G01N 2201/0438; G01N 2021/9063
See application file for complete search history.

(56) References Cited

U.S. PATENT DOCUMENTS 3,232,429 A * 2/1966 Norwich ............... B07C 5/3404
209/524
4,367,405 A   1/1983 Ford
(Continued)

FOREIGN PATENT DOCUMENTS

DE       199 20 007    7/2000
EP       0 177 004     4/1986
(Continued)

*Primary Examiner* — Jennifer D Bennett
(74) *Attorney, Agent, or Firm* — Clark & Brody LP

(57) ABSTRACT

The invention relates to an installation for optically inspecting containers (2) manufactured by a forming machine at the outlet of which the containers travel by means of a conveyor (5) past at least one inspection device (I) including at least one camera (10) mounted inside a support chamber (11). The installation includes a system for fastening the support chamber (11) on the conveyor (5) in such a manner that the support chamber (11) is positioned on one side of the conveyor and presents, below the conveyor, a low section (11*b*) in which the camera (10) is mounted, the support chamber (11) also presenting, above the conveyor, a high section (11*h*) provided with an observation port (15) and in which an optical deflector system (16) is mounted.

12 Claims, 2 Drawing Sheets

(56) References Cited

U.S. PATENT DOCUMENTS

| | | | | |
|---|---|---|---|---|
| 4,859,863 A | * | 8/1989 | Schrader | B07C 5/3404 |
| | | | | 250/556 |
| 5,270,535 A | * | 12/1993 | Leser | G01N 21/90 |
| | | | | 250/223 B |
| 5,729,340 A | | 3/1998 | Griesbeck et al. | |
| 6,089,108 A | | 7/2000 | Lucas | |
| 9,522,758 B2 | * | 12/2016 | Grote | G01B 11/24 |
| 2007/0182953 A1 | * | 8/2007 | Tassic | B65G 17/20 |
| | | | | 356/237.1 |
| 2018/0172602 A1 | * | 6/2018 | Beck | G01N 21/958 |

FOREIGN PATENT DOCUMENTS

| | | | |
|---|---|---|---|
| EP | 0 380 408 | 8/1990 | |
| EP | 0 540 419 | 5/1993 | |
| EP | 1 477 797 | 11/2004 | |
| FR | 2 712 089 | 5/1995 | |
| FR | 2712089 A1 * | 5/1995 | G01N 21/90 |
| FR | 2 988 846 | 10/2013 | |

\* cited by examiner

INSTALLATION FOR OPTICAL INSPECTION OF GLASS CONTAINERS AT THE OUTLET OF A FORMING MACHINE

The present invention relates to the technical field of optically inspecting translucent or transparent hollow containers or objects at high temperature.

The invention seeks more particularly to provide fast optical inspection of objects such as glass bottles or flasks leaving a manufacturing or forming machine. Thus, the invention seeks to inspect objects in a hot region of a manufacturing installation.

In conventional manner, a forming machine is constituted by various cavities, each having at least one mold in which the container takes on its final shape at high temperature. At the outlet from the forming machine, containers that are still at high temperature are taken hold of via their collars in order to be moved so as to constitute a line on a transport conveyor. The spacing between containers can vary and is imposed by the forming machine, depending on its own center-to-center distance and on the diameters of the containers. The transport conveyor causes the containers to pass in succession through various stations for treatments such as spraying and annealing. It should be observed that the forming machine generates vibration, in particular on the transport conveyor, because of heavy parts moving quickly at a high rate.

It would be advantageous to be able to identify a forming defect as soon as possible at the outlet from the forming machine before passing through the various treatment stations so as to be able to correct that defect as soon as possible on the forming machine. In particular, it is thus advantageous to detect containers having dimensional deviations or deformations that are associated directly with the settings of the forming process, in order to correct the process as quickly as possible in the event of it drifting.

In the state of the art it is known to install a contactless optical inspection system at the outlet from the forming machine in order to inspect containers that are still hot, i.e. at a temperature lying in the range 300° C. to 600° C. Such an optical inspection system generally comprises at least one camera that is sensitive to visible radiation or indeed to the infrared radiation emitted by the containers, e.g. as described in patent EP 1 477 797.

Such an optical inspection system requires adaptation to the stresses imposed by the industrial environment. Patent EP 0 177 004 proposes a contactless system for inspecting glass containers that are still hot, immediately after being formed. That system comprises a lighting source and a linear camera mounted in an enclosure that is secured to the floor and that is referred to as a "protection body". The enclosure is situated above the plane of the conveyor so that the line of sight of the camera is centered on the top of the mouth on a horizontal radius. In front of the camera lens there is mounted a heat absorption filter so that the radiation produced by the containers at wavelengths in the region of one micrometer does not disturb reception of light radiation emitted in the visible by the lighting source. At the front of the enclosure, there is also situated a de-dusting chamber, which is closed by a wall having a slot that enables the linear camera to observe the containers. That enclosure is surrounded at a distance by a sleeve in order to define a flow space for cooling air leading into the de-dusting chamber, which is thus raised to excess pressure.

Even if such a device has arrangements for protecting the camera from the external environment, it is found that the proposed adaptations do not suffice for protecting the camera from the conditions imposed by the industrial environment of a forming machine. Furthermore, such a system needs to be adjusted manually in order to adjust the field and the sighting direction of the camera as a function of the size of the containers. Specifically, the angle of inclination and/or the height of the conveyor transporting the containers is modified depending on the size of the containers being manufactured. Such changes require the enclosure and possibly also the camera within the enclosure to be moved in order to adjust position as a function of variations in the height and/or the angle of inclination of the conveyor in order to keep the field and the sighting direction of the camera level with the containers.

In order to remedy that problem, patent EP 0 540 419 proposes a device that is designed to inspect containers at high temperature automatically and without contact. That device has a mounting frame for at least one source of light and a camera. The frame is in the form of a non-deformable structure placed astride the conveyor, without being connected to the structure of the conveyor. The frame is connected to the floor by being supported on jacks. The jacks are caused to move so as to position the frame relative to the floor as a function of the angle of inclination of the conveyor, which angle is adjustable in a vertical plane. The light source and the camera are mounted on a frame that is independent of the structure of the transport conveyor since, as mentioned in the description, mounting inspection members directly on the structure of the conveyor belt cannot be envisaged because of the high level of vibration to which that structure is subjected. Nevertheless, such a device presents a cost that is high and a footprint on the floor that is large, limiting potential for installing it at the outlet of forming machines.

In the field of inspecting containers in a cold region, Document DE 199 20 007 discloses inspecting the mouths of containers transported by a conveyor by using an optical vision system mounted on the structure of the conveyor. A vision system situated in the cold region can be mounted on the structure of the conveyor, unlike a conveyor situated at the outlet from the machine for forming containers while hot, which outlet is subjected to high levels of vibration.

Still in the field of inspecting containers in the cold region, patent application FR 2 712 089 describes an optical device for inspecting the quality of transparent articles moved by a conveyor. That device has a light source and a camera with a linear measuring strip oriented in a direction that is perpendicular to the travel direction of the articles. An optical system adapted to produce mutually parallel light rays in the sighting plane of the measuring strip is interposed on the path of the light as transmitted or reflected by the article. The camera may be placed in various positions relative to the conveyor in order to receive the light beams.

The present invention seeks to remedy the drawbacks of the prior art by proposing an installation for optically inspecting glass containers at high temperature, the installation being designed to protect the camera from the external environment and to be easy to install at the outlet from a forming machine, while still presenting the ability to adjust the viewing field and sighting direction of the camera easily as a function of the size of the containers.

In order to achieve such objects, the installation of the present invention serves to optically inspect glass containers at high temperature as manufactured by a forming machine with the containers traveling at a high rate at the outlet from the machine in a transfer direction past at least a first inspection device, the containers being placed in succession on the conveyor plane of a conveyor of variable height or slope, the first inspection device including at least one camera mounted inside a support chamber.

According to the invention, the installation includes a system for fastening the support chamber of the first inspection device on the conveyor in such a manner that the support chamber is positioned on one side of the conveyor, presenting, below the conveyor plane, a low section in which the camera is mounted so as not to be exposed directly to the radiation from the containers, the support chamber also presenting, above the conveyor plane, a high section provided with an observation port and having mounted therein an optical deflector system so that the field of observation of the camera is directed through the observation port in order to inspect the traveling containers.

Furthermore, the installation of the invention may also comprise in combination at least one or more of the following additional characteristics:

- a second inspection device including at least one camera mounted inside a support chamber fastened to the conveyor on the same side as the side on which the first inspection device is positioned, the support chamber of the second device presenting, below the conveyor plane, a low section in which the camera is mounted so as not to be exposed directly to the radiation from the containers, the support chamber also presenting, above the conveyor plane, a high section provided with an observation port and having mounted therein an optical deflector system so that the field of observation of the camera is directed through the observation port in order to inspect the traveling containers;
- the inspection devices are positioned in such a manner that the sighting directions of the cameras define between them an angle lying in the range 20° to 90°;
- the inspection devices are positioned in such a manner that the sighting direction of a camera defines, relative to the plane orthogonal to the transfer direction, an angle lying in the range 10° to 45°;
- each inspection device includes as its optical deflector system, a deflector mirror, and in that the camera is provided with its lens;
- the system for fastening a support chamber on the conveyor includes a clamping collar carried by the conveyor and surrounding a cylindrical section of the support chamber, thereby enabling the sighting direction of the camera to be adjusted;
- the system for fastening a support chamber on the conveyor includes an adjustment device for adjusting the spacing between said chamber and the conveyor and/or the position of said chamber along the conveyor;
- each support chamber includes in its low section an air cooling system generating a stream of cold air directly on the camera;
- the air cooling system is a vortex tube fed with compressed air and delivering firstly a cold air stream towards the camera and secondly a hot air stream in the high section in order to create excess pressure therein; and
- a light source fastened to the conveyor on its side opposite from the side where the inspection device(s) is/are positioned, so that each camera observes the containers while backlighted.

Various other characteristics appear from the following description given with reference to the accompanying drawings, which show embodiments of the invention as non-limiting examples.

Figure 1:
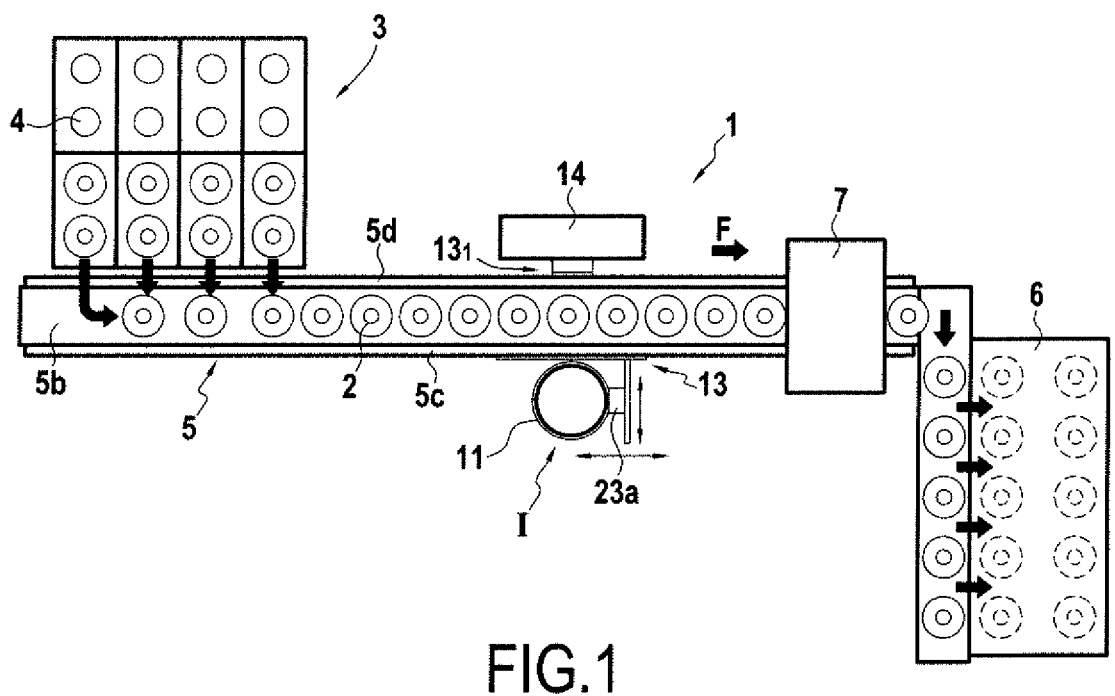
FIG. 1 is a diagrammatic plan view showing an inspection installation in accordance with the invention positioned at the outlet from a machine for forming containers.
Figure 2:
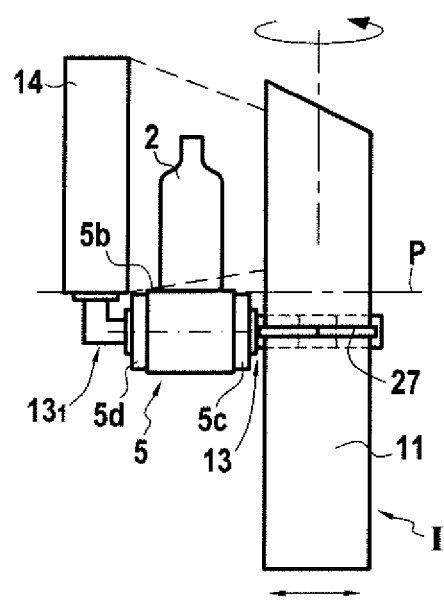
FIG. 2 is a diagrammatic side view showing the inspection installation in accordance with the invention that is shown in FIG. 1.

As shown more clearly in FIG. 1, the invention provides an installation 1 enabling transparent or translucent containers 2, e.g. such as glass bottles or flasks, to be inspected while they are hot. The installation 1 is placed so as to be able to inspect the containers 2 leaving a manufacturing or forming machine 3 of any known type. At the outlet from the forming machine, the containers 2 are at a high temperature, typically lying in the range 300° C. to 600° C.

In conventional manner, the forming machine 3 has a series of cavities 4, each used for forming a container 2. In known manner, the containers 2 that have just been formed by the machine 3 are placed in succession on an outlet conveyor 5 so as to form a line of containers. The containers 2 are transported in line by the conveyor 5 in a transfer direction F so as to be taken in succession through various treatment stations. Conventionally, the conveyor 5 has a stationary structure 5a standing on the floor S and supporting a moving belt 5b defining a conveyor plane P on which the containers 2 stand. This conveyor 5 is of variable height, i.e. the distance between the conveyor plane P and the floor S can be varied, while remaining parallel to the floor, or else with an angle of inclination between the floor and the transfer direction F.

The movable belt 5b moves on the stationary structure 5a, which has two side walls 5c and 5d that extend substantially parallel to each other beneath the conveyor plane P. These two stationary walls 5c and 5d define the two opposite sides of the stationary structure 5a, i.e. respectively the front side and the rear side of the conveyor as seen from a zone where a person can take action. The walls 5c and 5d are thus respectively referred to as the "front" wall and as the "rear" wall of the conveyor. These walls 5c and 5d may be of any shape, giving the stationary structure 5a a section that may be rectangular, X-shaped, H-shaped, upside-down U-shaped, omega-shaped, etc.

In accordance with the invention, the installation 1 of the invention is placed as close as possible to the forming machine 3 so that the outlet conveyor 5 causes the hot containers 2 to pass in succession in front of the inspection installation 1, thus making it possible to perform in-line inspection of a defective or non-defective state of the containers 2. Typically, the installation 1 is positioned between the outlet of the forming machine 3 and the annealing oven 6, and preferably before a surface treatment hood 7 that generally constitutes the first of the treatment stations after forming.

Figure 4:
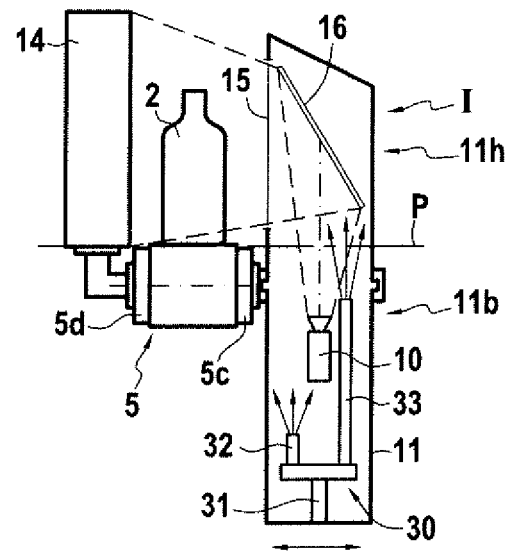
FIG. 4 is a partially cutaway view analogous to FIG. 2 and showing the inspection installation in accordance with the invention.
Figure 3:
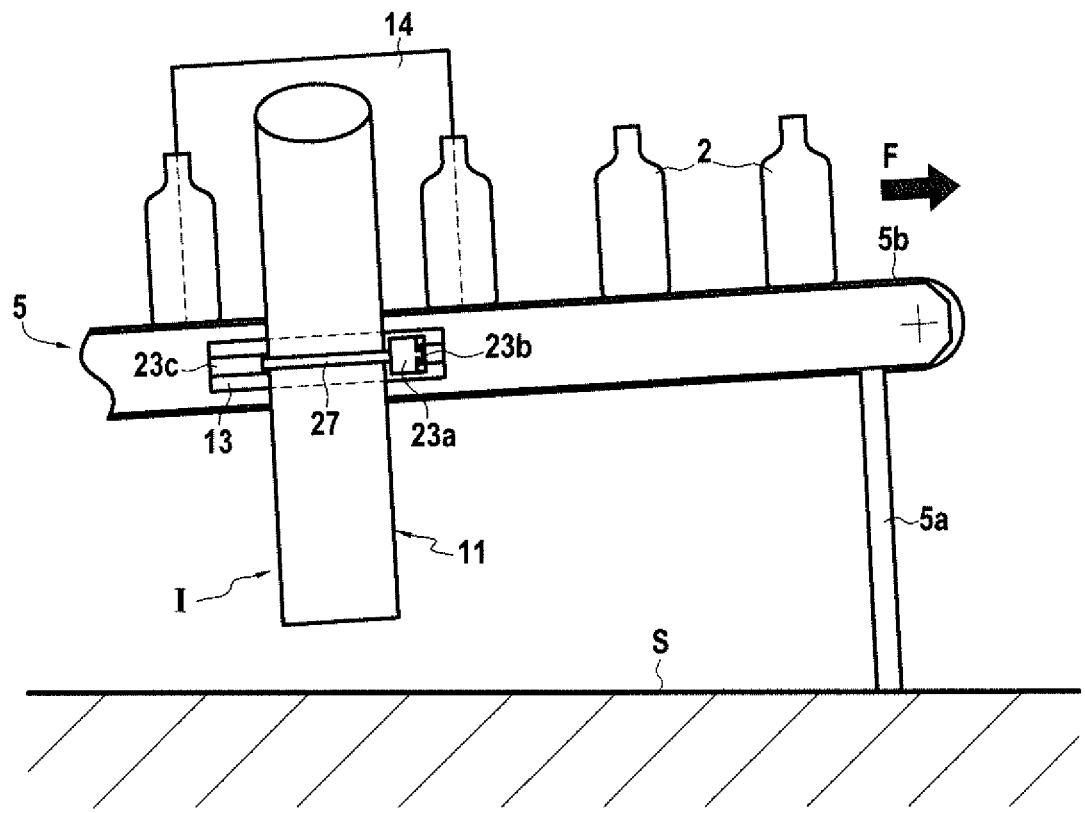
FIG. 3 is a diagrammatic side view showing the inspection installation in accordance with the invention that is shown in FIG. 1.
Figure 5:
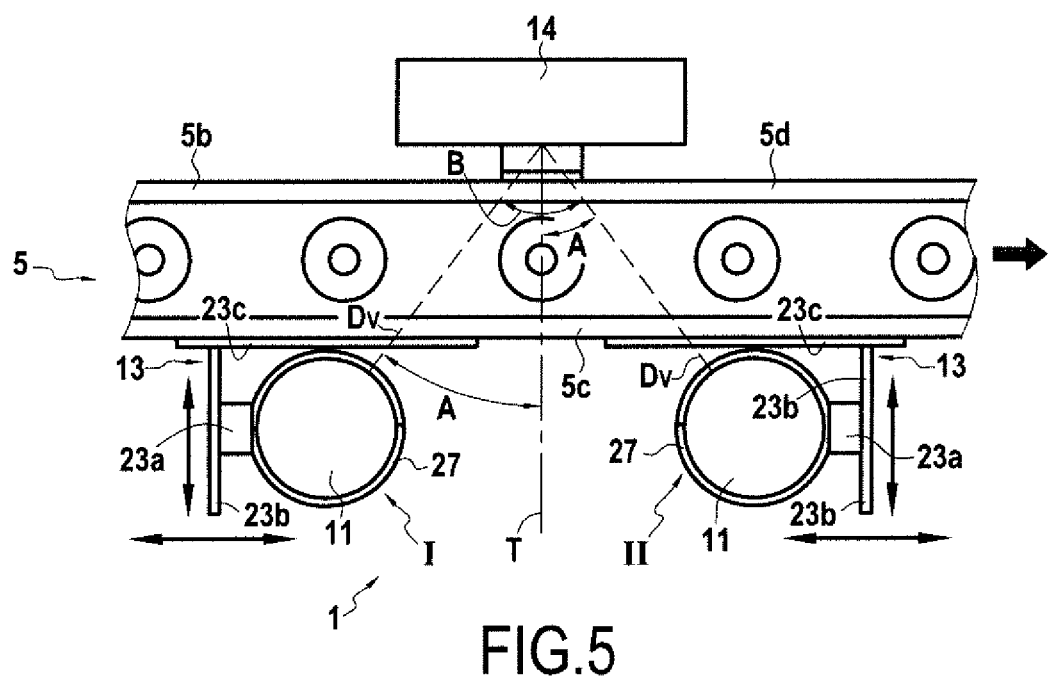
FIG. 5 is a diagrammatic plan view showing another variant embodiment of an inspection installation in accordance with the invention.

In the embodiment shown in FIGS. 1 to 4, the installation 1 of the invention has a first inspection device I, while in the example shown in FIG. 5, it has both a first inspection device I, and also a second inspection device II analogous to the first inspection device I. Each inspection device I, II has at least one camera 10 mounted inside a support chamber, enclosure, or box 11.

Each inspection system I, II has at least one camera 10 together with its lens. Typically, the camera 10 has an electronic image sensor that delivers an electronic image, which may be in digital or analog form, to a system for analyzing and/or storing and/or displaying images. Said image sensor may be linear or in the form of a matrix. It is sensitive to any type of light, but for applications for inspecting hot containers, it is known to make use of sensors that are sensitive either to the visible light emitted by a light source illuminating the containers, or else to the infrared radiation emitted by the containers. A lens mounted on the camera focuses an optical image of the containers or of a portion of the containers onto the image sensor. In other words, the lens produces an optical image that the image sensor converts into an electronic image.

In accordance with the invention, the installation 1 of the invention includes, for each inspection device I, II, a fastener system 13 for fastening the support chamber 11 on the conveyor 5 in such a manner that the support chamber 11 is positioned on one side of the conveyor 5. In the embodiment shown in FIGS. 1 to 4, the support chamber 11 is fastened to the front side, i.e. on the front wall 5c of the conveyor 5. In the example shown in FIG. 5, the support chambers 11 of the first inspection device and of the second inspection device are both fastened on the same side of the conveyor 5, namely on the front side, i.e. on the front wall 5c.

The installation 1 also has a light source 14 fastened on the conveyor 5 on the side opposite from the side where the inspection device(s) is/are positioned, so that each camera 10 observes the containers while they are backlighted. This light source 14 may be of any known type and is thus situated in the example shown on the rear side of the conveyor, being fastened on the rear wall 5c. The light source 14 is secured to the conveyor system by a fastener system $13_1$ of any type, which may optionally be associated with a vibration damper system.

Each support chamber 11 is fastened on the conveyor 5 while presenting, below the conveyor plane P, a low portion or section 11b in which the camera 10 is installed so that it is not directly exposed to the radiation from the containers 2. Likewise, each support chamber 11 is fastened on the conveyor 5 while presenting, above the conveyor plane P, a high portion or section 11h provided with an observation port 15. It should be understood that each support chamber 11 has a high section 11h rising above the conveyor plane P and a low section 11b extending below the conveyor plane P.

Preferably, the high and low sections 11h and 11b of the support chamber 11 are not separate from each other so that the support chamber defines a single internal volume, thereby enabling hot air in the low section to rise into the high section.

Each support chamber 11 may be made in various ways. In the example shown, each support chamber 11 is made in the form of a cylindrical box that is closed at each of its ends, and that is mounted so as to extend vertically.

The high section 11h receives an optical image deflector system 16 so that the field of observation of the camera 10 looks through the observation port 15 in order to inspect the moving containers. In the embodiment shown, each inspection device I, II has, as its optical deflector system 16 a deflector mirror 16. As can be seen in FIG. 4, the camera is positioned substantially vertically with its field of observation pointing towards the high section 11h so as to be diverted by the deflector mirror. The field of observation of the camera is such as to enable containers to be observed over their entire height. It is considered that the diverted field of observation of the camera presents a sighting direction Dv defined as the direction of the optical axis when projected vertically onto the conveyor plane P, as shown in FIG. 5.

Advantageously, the inspection devices I, II are positioned so that the sighting direction of each camera 10 defines, relative to the plane T orthogonal to the transfer direction F, an angle A that lies in the range 10° to 45°.

In the embodiment shown in FIG. 5 and having two inspection devices I and II, the inspection devices are positioned in such a manner that the sighting directions Dv of the optical sensors 10 define between them an angle B lying in the range 20° to 90°.

Using the fastener systems 13 and $13_1$ to mount the inspection devices I and II securely on the conveyor 5 makes it possible to follow and adapt to changes of position of the conveyor and also to changes in the slope of the conveyor without there being any need to perform adjustments, unlike prior art systems that are not securely fastened to the conveyor. Furthermore, surprisingly, this solution also makes it possible to follow and to adapt to the vibration and to the twisting of the conveyor under the effect of expansion, and without that having an impact on the inspection devices. This adaptation thus makes it possible to keep the field and direction of observation of the camera permanently stationary relative to the plane P of the conveyor. Each fastener system 13, $13_1$ may be made in any manner that is appropriate for obtaining a rigid connection, optionally associated with a vibration damper system.

According to an advantageous embodiment characteristic, the fastener system 13 for fastening a support chamber 11 on the conveyor 5 includes an adjustment device 23 for adjusting the spacing between said chamber 11 and the conveyor 5 and/or the position along the conveyor of said chamber. In other words, the adjustment device 23 enables each chamber to be moved laterally parallel to the transfer direction F and also perpendicularly to the transfer direction F. For example, the chamber 11 is supported by a support block 23a that is mounted to slide in a first slideway 23b so as to allow the chamber to move in the plane T perpendicular to the transfer direction. This first slideway 23b is slidably mounted on a second slideway 23c that extends perpendicularly to the first, i.e. parallel to the transfer direction. The second slideway 23c is rigidly mounted on the conveyor 5, and in particular on the front wall 5c.

According to an advantageous embodiment characteristic, the fastener system 13 for fastening the support chamber 11 on the conveyor 5 includes a clamping collar 27 carried by the conveyor and surrounding a cylindrical section of the support chamber 11 enabling the sighting direction Dv of the camera to be adjusted. In this example, the fastener system 13 includes a device serving to adjust both the angle A and also the sighting direction Dv that a camera defines relative to the plane T orthogonal to the transfer direction F.

In the example shown, the clamping collar 27 is carried by the support block 23a, which is provided with a system enabling the support chamber 11 to be tightened or loosened relative to the support block 23a so as to be able both to turn the chamber 11 about its vertical axis, and also to block the chamber 11 in a fixed angular position. Thus, the device 27 for adjusting the angle and the direction of the camera is combined with the device 23 for adjusting the spacing between said chamber 11 and the conveyor 5 and/or the position of said chamber along the conveyor. Naturally, it is possible to envisage mounting the device 27 for adjusting the angle and the direction of the camera directly on the conveyor.

According to another advantageous characteristic, the installation of the invention makes it possible, by means of the adjustment devices 23 and 27, to modify easily the sighting angle as a function of the spacing between the containers. The spacing of the containers traveling on the conveyor belt depends on the center-to-center distance of the manufacturing machine, on the number of sections and on the number of cavities per section, on the manufacturing rate, on the body diameter of the containers, and on the speed of the conveyor. Thus, each camera can be adjusted easily to observe under optimized conditions each of the individual containers that is caused to travel past the camera.

According to an advantageous embodiment characteristic, each support chamber 11 includes in its low section 11b an air cooling system 30 that generates a stream of cold air directly on the camera 10. Advantageously, the air cooling system 30 is a vortex tube or a Ranque-Hilsch tube, connected to a pipe 31 for feeding compressed air and delivering firstly via a nozzle 32 a stream of cold air that is directed towards the camera 10, and secondly via a tube 33 a stream of hot air going into the high section 11h in order to create excess pressure therein. The hot air stream is preferably directed towards the high section 11h so as to heat the deflection mirror and the port 15 in order to avoid condensation appearing. The high end 11h of the chamber 11 is provided with air discharge openings.

The invention is not limited to the examples described and shown, since various modifications can be made thereto without going beyond the ambit of the invention.

The invention claimed is:

1. An installation for optically inspecting glass containers (2) at high temperature as manufactured by a forming machine (3) with the containers traveling at a high rate at an outlet from the forming machine in a transfer direction (F) past at least a first inspection device (I), the containers being placed in succession on a conveyor plane (P) of a conveyor (5) of variable height or slope, the conveyor having a stationary structure (5a) standing on a floor(S), the first inspection device (I) including at least one first inspection device camera (10) mounted inside a first inspection device support chamber (11), the installation further comprising a system (13) for fastening the first inspection device support chamber (11) on the stationary structure of the conveyor (5) in such a manner that the first inspection device support chamber (11) is positioned on one side of the conveyor, presenting, below the conveyor plane (P), a low section (11b) in which the at least one first inspection device camera (10) is mounted so as not to be exposed directly to radiation from the containers, the first inspection device support chamber (11) also presenting, above the conveyor plane (P), a high section (11h) provided with an observation port (15) and having mounted therein an optical deflector system (16) so that a field of observation of the at least one first inspection device camera is directed through the observation port in order to inspect the containers when traveling.

2. The inspection installation according to claim 1, wherein the inspection installation includes a second inspection device including at least one second inspection device camera (10) mounted inside a second inspection device support chamber (11), the second inspection device support chamber (11) fastened to the conveyor (5) on the same side as the side on which the first inspection device (I) is positioned, the second inspection device support chamber (11) presenting, below the conveyor plane (P), a low section (11b) in which the at least one second inspection device camera (10) is mounted so as not to be exposed directly to the radiation from the containers, the second inspection device support chamber (11) also presenting, above the conveyor plane (P), a high section (11h) provided with an observation port (15) and having mounted therein an optical deflector system (16) so that the field of observation of the at least one second inspection device camera is directed through the observation port in order to inspect the containers when traveling.

3. The inspection installation according to claim 2, characterized in that the first and second inspection devices (I, II) are positioned in such a manner that sighting directions (Dv) of the at least one first and second inspection device cameras define between them an angle (B) lying in a range of 20° to 90°.

4. The inspection installation according to claim 1, characterized in that the first inspection devices (I, II) is positioned in such a manner that a sighting direction (Dv) of the at least one first inspection device camera defines, relative to the plane orthogonal to the transfer direction, an angle (A) lying in a range 10° to 45°.

5. The inspection installation according to claim 2, characterized in that each of the first and second inspection devices (I, II) includes as the optical deflector system (16) thereof, a deflector mirror, and in that each of the at least one first and second inspection device cameras (10) is provided with a lens.

6. The inspection installation according to claim 1, characterized in that the system (13) for fastening the first inspection device support chamber (11) on the conveyor (5) includes a clamping collar (27) carried by the conveyor (5) and surrounding a cylindrical section of the first inspection device support chamber (11), thereby enabling a sighting direction (Dv) of the at least one first inspection device camera to be adjusted.

7. The inspection installation according to claim 1, characterized in that the system (13) for fastening the first inspection device support chamber (11) on the conveyor (5) includes an adjustment device (23a, 23b, 23c) for adjusting a spacing between the first inspection device support chamber and the conveyor and/or the position of the first inspection device support chamber along the conveyor.

8. The inspection installation according to claim 1, characterized in that the first inspection device support chamber (11) includes in the low section (11b) thereof, an air cooling system (30) generating a stream of cold air directly on the at least one first inspection device camera.

9. The inspection installation according to claim 8, characterized in that the air cooling system (30) is a vortex tube fed with compressed air and delivering firstly a cold air stream towards the at least one first inspection device camera (10) and secondly a hot air stream in the high section (11h) in order to create excess pressure therein.

10. The inspection installation according to claim 1, wherein a light source (14) fastened to the conveyor (5) on its side opposite from the side where the first inspection device is positioned, so that the at least one first inspection device camera observes the containers while backlighted.

11. The inspection installation according to claim 2, characterized in that each of the first and second inspection device support chambers (11) include in each low section (11b) thereof, an air cooling system (30) generating a stream of cold air directly on the each of the at least one first and second inspection device cameras.

12. The inspection installation according to claim 2, wherein a light source (14) fastened to the conveyor (5) on its side opposite from the side where the each of the first and second inspection devices are positioned, so that each of the at least one first and second inspection device cameras observe the containers while backlighted.

\* \* \* \* \*